United States Patent
Fukuroi et al.

(10) Patent No.: US 6,679,760 B2
(45) Date of Patent: Jan. 20, 2004

(54) LAPPING METHOD OF MAGNETIC HEAD SLIDER AND LAPPING METHOD OF BAR

(75) Inventors: Osamu Fukuroi, Kwai Chung (HK); Morihiro Ohno, Kwai Chung (HK); Ryuji Fujii, Kwai Chung (HK)

(73) Assignee: Sae Magnetics (H.K.) Ltd., Kwai Chung (HK)

( * ) Notice: Subject to any disclaimer, the term of this patent is extended or adjusted under 35 U.S.C. 154(b) by 0 days.

(21) Appl. No.: 10/075,375

(22) Filed: Feb. 15, 2002

(65) Prior Publication Data

US 2002/0119734 A1 Aug. 29, 2002

(30) Foreign Application Priority Data

Feb. 23, 2001 (JP) .............................. 2001-048157

(51) Int. Cl.[7] .................................. B24B 1/00
(52) U.S. Cl. .................. 451/41; 451/259; 451/287; 451/288; 451/272; 451/905
(58) Field of Search .................. 451/41, 259, 287, 451/272, 905, 288

(56) References Cited

U.S. PATENT DOCUMENTS 6,497,611 B2 * 12/2002 Sakurada et al. .............. 451/5
6,501,622 B2 * 12/2002 Koishi ..................... 360/236.6

* cited by examiner

Primary Examiner—Joseph J. Hail, III
Assistant Examiner—Shantese McDonald
(74) Attorney, Agent, or Firm—Armstrong, Kratz, Quintos, Hanson & Brooks, LLP

(57) ABSTRACT

A lapping method of a magnetic head slider provided with an element-forming surface, an ABS and an MR element formed on the element-forming surface, including a step of setting the magnetic head slider to be lapped on a lapping means, and a step of lapping by the lapping means the ABS of the magnetic head slider with while keeping an angle between the element-forming surface of the magnetic head slider and a lapping direction in a range greater than 0 degrees and equal to or less than 30 degrees.

5 Claims, 6 Drawing Sheets

LAPPING METHOD OF MAGNETIC HEAD SLIDER AND LAPPING METHOD OF BAR

BACKGROUND OF THE INVENTION

1. Field of the Invention

The present invention relates to a lapping method of a magnetic head slider with a magnetoresistive effect (MR) element, used in a magnetic disk drive apparatus or a hard disk drive (HDD) for example, and to a lapping method of a bar provided with a plurality of aligned magnetic head sliders.

2. Description of the Related Art

Recently, a read/write track width of a thin-film magnetic head has become very narrow to satisfy the requirement for ever increasing data storage capacities and densities in today's magnetic disk drive apparatus. Then, it has become necessary to fabricate an MR element such as an anisotropic magnetoresistive effect (AMR) element or a giant magnetoresistive effect (GMR) element with a narrower track width and a shorter MR height. More specifically, MR elements with a very short MR height of about 0.2–0.15 μm will be mass-produced in the near future.

Such shortening in MR height has sometimes induced characteristic degradation of the MR element when the air bearing surface (ABS) of the magnetic head slider is finished or lapped. Hereinafter, this problem which has occurred in the recent MR element will be described in detail.

The MR element with an extremely short MR height has inherently a very narrowed shield gap. For example, the total thickness in upper and lower shield gap layers of a recent MR element is as small as 0.1 μm or less. The MR characteristics of the MR element with very thin shield gaps is susceptible to fine scratches formed on the ABS of the slider when lapping. Particularly, the MR element with an MR height of 0.3 μm or less is extremely susceptible to such fine scratches on the ABS.

In general, the ABS of a magnetic head slider with an MR element is lapped by using diamond abrasive with a particle diameter of about 0.1–0.5 μm, and thus fine scratches as a result of the abrasive will be formed on the lapped surface. A roughness of the element surface after lapping will be about Ra=0.3–1.0 nm. These fine scratches will, depending upon its running directions, namely lapped directions, greatly degrade the output characteristics of the MR element.

FIG. 1 illustrates lapping directions viewed from the ABS, in a conventional ABS finishing process of a magnetic head slider, and FIG. 2 shows a plane view of an MR element section viewed from the ABS, for illustrating problems occurring in the conventional ABS finishing process.

In these figures, reference numeral 10 denotes a lower shield layer of the MR element, 11 denotes an upper shield layer of the MR element, which also serves as a lower pole layer of an inductive element, 12 denotes an upper pole layer of the inductive element, and 13 denotes lapped directions, respectively. As shown in FIG. 2, an upper shield gap layer 14 and a lower shield gap layer 15 are inserted between the upper and lower shield layers 10 and 11, and between these upper and lower shield gap layers 14 and 15, an MR layer 16 and lead conductor layers 17 and 18 for this MR layer 16 are inserted.

According to this finishing method, because a bar consisting of a plurality of magnetic head sliders continuously coupled and aligned is lapped by turning itself with respect to a rotating lapping plate, the lapped directions 13 become random, as shown in FIG. 1, and thus scratches run along random directions. As a result, metal material is drawn from metal layers such as the lower shield layer 10, the upper shield layer 11, the lead conductor layer 17 and/or the lead conductor layer 18 as a result of the scratches causing smears 19 to be produced.

If the shield gap layers are sufficiently thick, as in the conventional MR element, these smears 19 become insignificant. However, in case of a recent MR element having extremely thin shield gap layers, these smears 19 will make short circuits to reduce an apparent resistance of the MR element and also to degrade MR conversion characteristics of the MR element, namely to reduce a peak to peak (PP) voltage output from the MR element in response to an applied alternating magnetic field.

FIG. 3 illustrates lapping directions viewed from the ABS, in another ABS finishing process of a magnetic head slider, implemented by the applicant so as to solve the above-mentioned problems, and FIG. 4 shows a plane view of an MR element section viewed from the ABS, for illustrating problems occurring in the applicant's ABS finishing process.

In these figures, reference numeral 30 denotes a lower shield layer of the MR element, 31 denotes an upper shield layer of the MR element, which also serves as a lower pole layer of an inductive element, 32 denotes an upper pole layer of the inductive element, and 33 denotes lapped directions, respectively. As shown in FIG. 4, an upper shield gap layer 34 and a lower shield gap layer 35 are inserted between the upper and lower shield layers 30 and 31, and between these upper and lower shield gap layers 34 and 35, an MR layer 36 and lead conductor layers 37 and 38 for this MR layer 36 are inserted.

According to this finishing method, because a bar consisting of a plurality of magnetic head sliders continuously coupled and aligned is lapped by relatively moving the bar with respect to a lapping plate in a direction along the element-forming surface of the bar, the lapped direction 33 becomes parallel with the lower shield layer 30 and the upper shield layer 31 as shown in FIG. 3 and thus scratches run along the same direction.

This latter finishing method can prevent an apparent resistance of the MR element from being reduced even if the MR element has extremely thin shield gap layers. However, degradation in MR conversion characteristics of the MR element will occur. The reasons for this are that (1) because the lead conductor layers 37 and 38 are drawn as a result of the scratches as shown in FIG. 4, smears 39 parallel to the lower shield layer 30 and the upper shield layer 31 are produced to shorten an effective track width of the MR element, and that (2) because of mechanical stress applied to the MR layer 36 as a result of the lapping, a part of this MR layer is altered causing loss of MR conversion function of this part.

SUMMARY OF THE INVENTION

It is therefore an object of the present invention to provide a lapping method of a magnetic head slider and a lapping method of a bar, whereby degradations in both resistance and MR conversion characteristics of an MR element can be prevented.

According to the present invention, a lapping method of a magnetic head slider provided with an element-forming surface, an ABS and an MR element formed on the element-forming surface, includes a step of setting the magnetic head slider to be lapped on a lapping means, and a step of lapping by the lapping means the ABS of the magnetic head slider while keeping an angle between the element-forming surface of the magnetic head slider and a lapping direction in a range greater than 0 degrees and equal to or less than 30 degrees.

The ABS is lapped under the conditions where an angle between the element-forming surface of the magnetic head slider, namely, a shield gap layer of the MR element of the magnetic head slider and a lapping direction is kept in a range greater than 0 degrees and equal to or less than 30 degrees. Thus, not only lowering in a resistance of the MR element but also degradation in MR conversion characteristics of the MR element can be prevented.

It is preferred that the lapping direction is a direction from a side of a surface of the magnetic head slider, which surface is opposite the element-forming surface, toward a side of the element-forming surface.

According to the present invention, also, a lapping method of a bar having a plurality of aligned magnetic head sliders, the bar provided with an element-forming surface, an ABS and a plurality of MR elements formed on the element-forming surface includes a step of contacting the bar to be lapped to a rotating lapping plate while keeping an angle θ between the element-forming surface of the bar and a radial direction of the rotating lapping plate in a range equal to or greater than 60 degrees and equal to or less than 80 degrees, and a step of lapping by the rotating lapping plate the ABS of the bar.

The ABS of the bar is contacted to the lapping plate and lapped under the conditions where an angle between the element-forming surface of the magnetic head slider, namely, a shield gap layers of the MR element of the magnetic head slider and a radial direction of the lapping plate, is kept in a range equal to or greater than 60 degrees and equal to or less than 80 degrees. Thus, not only a lowering of the resistance of the MR element but also degradation in MR conversion characteristics of the MR element can be prevented. This has been confirmed by experiment.

It is preferred that the lapping step includes lapping the ABS of the bar by relatively moving the lapping plate in a direction crossing the ABS from a side of a surface of the bar, which surface is opposite the element-forming surface, toward a side of the element-forming surface.

It is also preferred that the lapping step includes lapping the ABS of the bar by fixing or varying the angle θ within a range equal to or greater than 60 degrees and equal to or less than 80 degrees.

It is further preferred that the lapping step includes lapping the ABS of the bar by using the lapping plate with diamond abrasive.

Further objects and advantages of the present invention will be apparent from the following description of the preferred embodiments of the invention as illustrated in the accompanying drawings.

DESCRIPTION OF THE PREFERRED EMBODIMENTS

Figure 1:
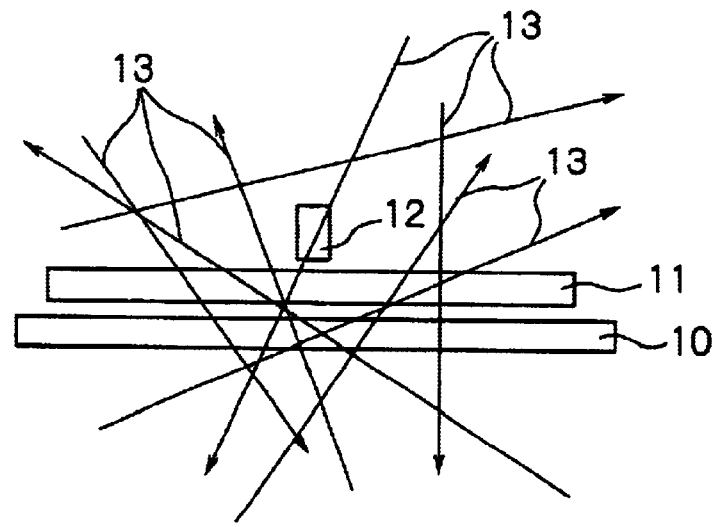
FIG. 1 already disclosed illustrates lapping directions viewed from the ABS, in a conventional ABS finishing process of a magnetic head slider.
Figure 2:
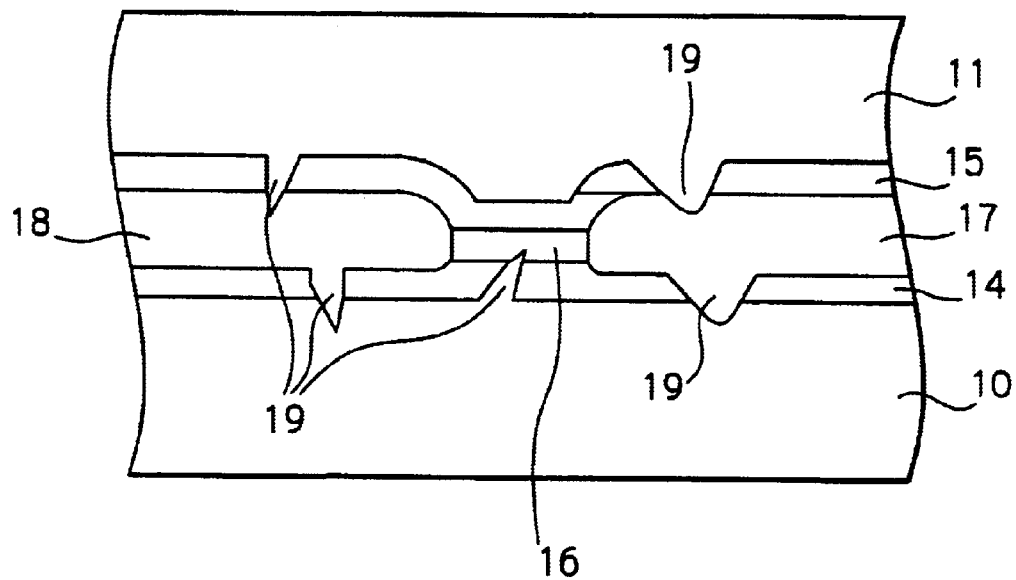
FIG. 2 already disclosed shows a plane view of an MR element section viewed from the ABS, for illustrating problems occurring in the conventional ABS finishing process.
Figure 3:
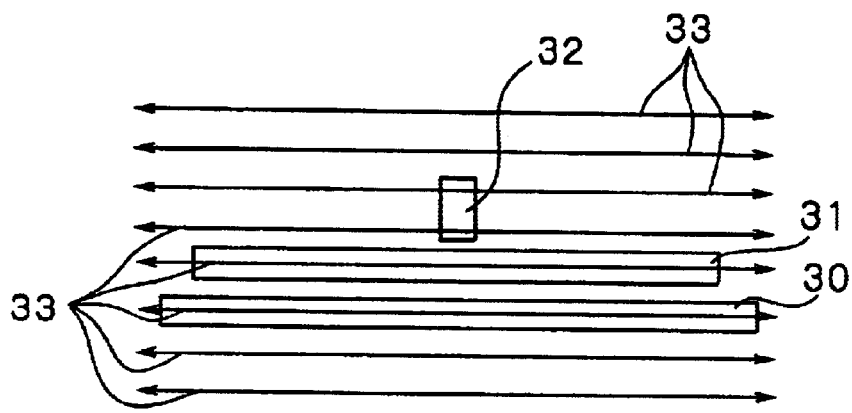
FIG. 3 already disclosed illustrates lapping directions viewed from the ABS, in another ABS finishing process of a magnetic head slider, implemented by the applicant.
Figure 4:
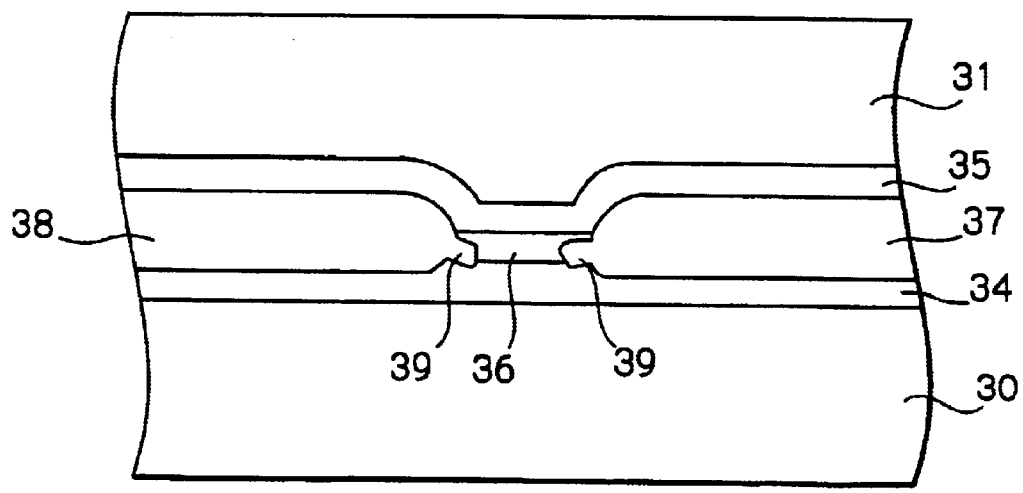
FIG. 4 already disclosed shows a plane view of an MR element section viewed from the ABS, for illustrating a part of problems occurring in the applicant's ABS finishing process.
Figure 5:
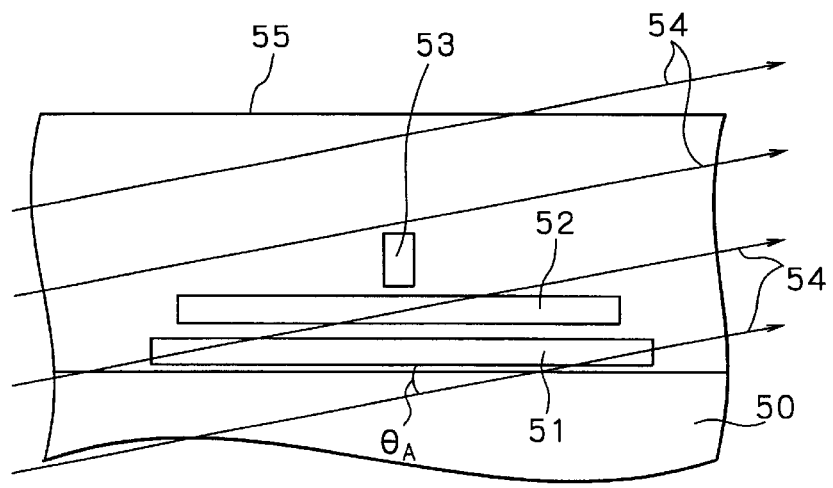
FIG. 5 illustrates lapping directions viewed from the ABS, in an ABS finishing process of a magnetic head slider, as a preferred embodiment according to the present invention.
Figure 6:
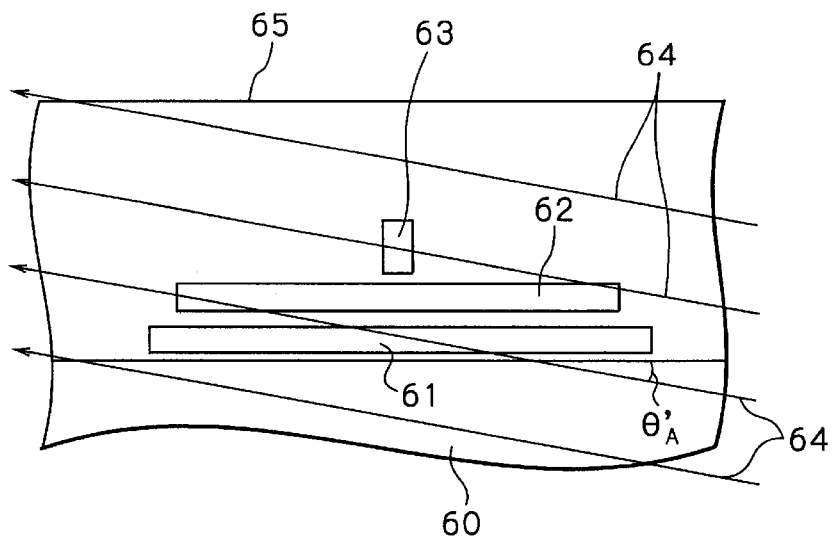
FIG. 6 illustrates lapping directions viewed from the ABS, in an ABS finishing process of a magnetic head slider, as a modification of the embodiment shown in FIG. 5.

FIG. 5 illustrates lapping directions viewed from the ABS, in an ABS finishing process of a magnetic head slider, as a preferred embodiment according to the present invention, and FIG. 6 illustrates lapping directions viewed from the ABS, in an ABS finishing process of a magnetic head slider, as a modification of this embodiment.

In these figures, reference numerals 50 and 60 denote substrates of the magnetic head sliders each having an MR element and an inductive element, 51 and 61 denote lower shield layers of the respective MR elements, laminated on the substrates 50 and 60 through under layers, not shown, 52 and 62 denote upper shield layers of the respective MR elements, which also serve as lower pole layers of the respective inductive elements, 53 and 63 denote upper pole layers of the respective inductive elements, 54 and 64 denote lapped directions, and 55 and 65 denote element-forming surfaces of the respective magnetic head sliders, respectively. Although it is not shown in these figures, upper shield gap layers and lower shield gap layers are respectively inserted between the lower shield layers 51 and 61 and the upper shield layers 52 and 62, and between these upper and lower shield gap layers 51 and 52, and 61 and 62, MR layers and lead conductor layers are inserted, respectively.

The lapping directions 54 and 64 of the respective magnetic head sliders are directions from the substrate sides of the slider, which are opposite sides to the element-forming surfaces 55 and 65 of the sliders toward the sides of the element-forming surfaces 55 and 65. Also, the lapping directions 54 and 64 are determined so that the angles $\theta_A$ and $\theta_A'$ which the lapping directions 55 and 65 form with the respective element-forming surfaces 55 and 56, are within a range greater than 0 degrees and equal to or less than 30 degrees. Particularly, in FIGS. 5 and 6, these angles are illustrated as $\theta_A=10$ degrees and $\theta_A'=10$ degrees.

In case that the ABS finishing of the magnetic head slider is carried out by setting the lapping direction as aforementioned, it is possible to prevent not only the lowering in the resistance of the MR element but also degradation in MR conversion characteristics of the MR element.

Figure 7:
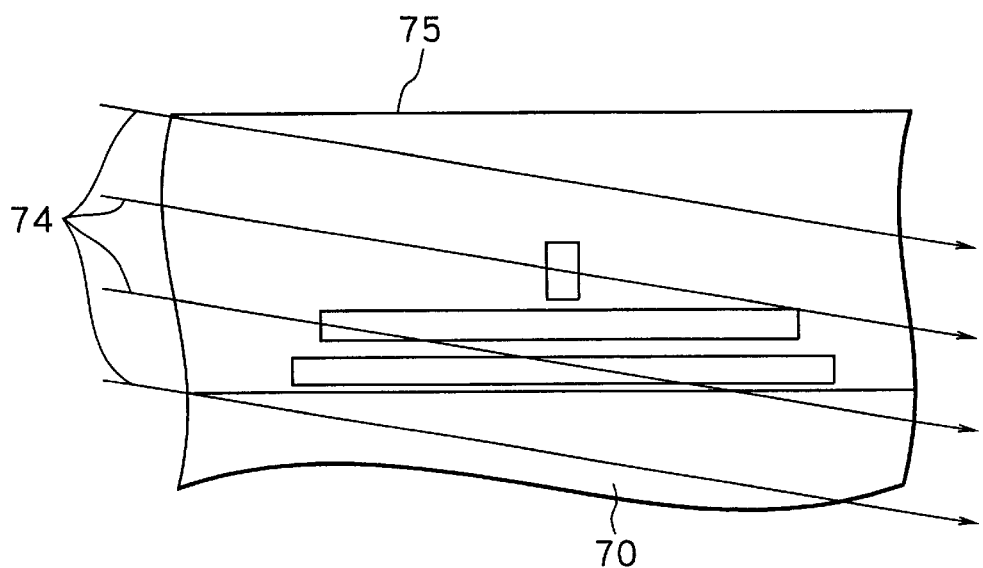
FIG. 7 illustrates lapping directions viewed from the ABS, in an ABS finishing process of a magnetic head slider, as a comparison example, the lapping direction in this example being opposite to that of the embodiment of FIG. 5 and also of the modification of FIG. 6.

It should be noted that a lowering in MR conversion characteristics cannot be prevented if the lapping direction is set to a direction 74 from a side of an element-forming surface 75 toward a side of a substrate 75 as shown in FIG. 7, namely, if the lapping is performed along the reverse direction 74 against that of the modification of FIG. 6. The reason for this occurrence in lowering is as follows.

Figure 8A:
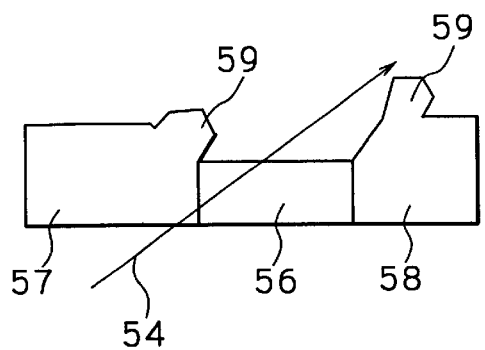
FIGS. 8a and 8b illustrate smears occurred in the embodiment of FIG. 5 and in the comparison example of FIG. 7, respectively.
Figure 8B:
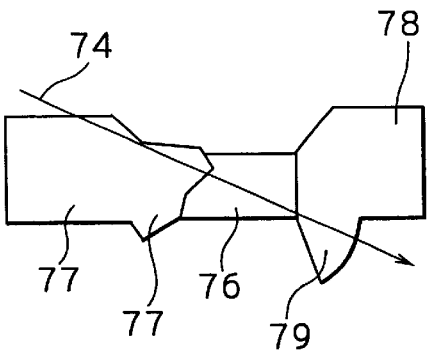

In case that the lapping is performed in the same direction as the embodiment of FIG. 5 or the modification of FIG. 6, no smear 59 will be overlapped on the MR layer 56 as shown in FIG. 8a even if the smears 59 are produced as a result of the scratches from the lead conductor layers 57 and 58. Thus, in this case, shortening of an effective track width of the MR element due to the lapping never occurs. However, in case that the lapping is performed in the reverse direction as shown in FIG. 7, smears 79 produced the scratches from the lead conductor layers 77 and 78 will be overlapped on the MR layer 76 as shown in FIG. 8b. Thus, in this case, shortening of an effective track width of the MR element due to the lapping occurs causing the MR conversion characteristics of the MR element, in other words, a peak-to-peak (PP) voltage output from the MR element in response to applied alternating magnetic field, to reduced.

The lapping of the ABS of the magnetic head slider is in fact achieved by lapping the ABS of a bar provided with a plurality of the magnetic head sliders continuously coupled and aligned. This bar is fabricated by forming many thin-film magnetic head elements each having an MR element on a wafer, and then cutting the wafer into the separated bars with the sliders each having the thin-film magnetic head element. After the lapping of the ABS of the bar, this bar is separated by cutting into individual magnetic head sliders.

Figure 9:
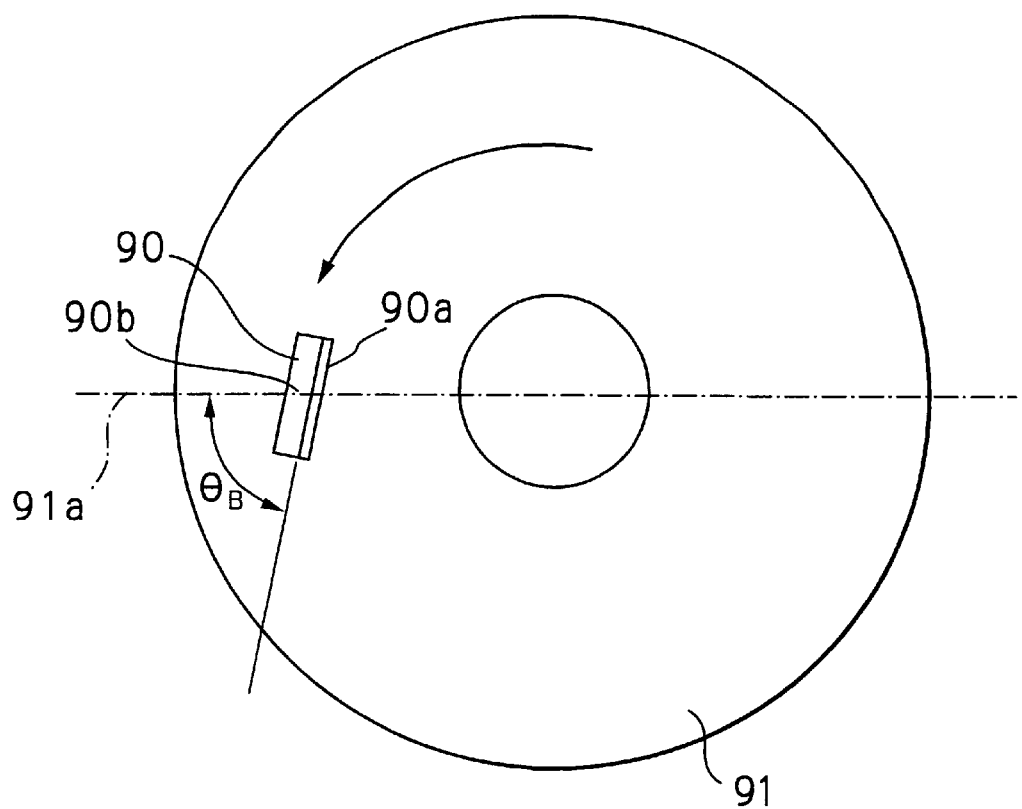
FIG. 9 illustrates an actual lapping process of the ABS of a bar.

FIG. 9 illustrates an actual lapping process of the ABS of a bar.

In the figure, reference numeral 90 denotes the bar with a plurality of magnetic head sliders continuously aligned, and 91 denotes a rotating lapping plate. Actually, the lapping of the bar is performed by pressing the bar against the lapping plate 91 so that the ABS of the bar 90 contacts a surface of the lapping plate 91 on which diamond abrasive with a particle diameter of about 0.25 µm is floating or in which the diamond abrasive is imbedded. A roughness of scratches caused by the lapping according to this embodiment is preferably Ra≦0.8 nm. If Ra increases than 0.8 nm, an altered or deteriorated region of the MR layer will increase and smears will be easily produced.

In this embodiment, an angle $\theta_B$ which an element-forming surface 90a of the bar 90 forms with a radial direction 91a of the lapping plate 91 is determined within a range from 60 degrees to 80 degrees (60 degrees$\leq\theta_B\leq$80 degrees). Also, in this embodiment, the lapping is performed so that the surface of the lapping plate 91 relatively moves by its rotation in a direction from the substrate-side of the bar 90 to the side of the element-forming surface 90a. In other words, the lapping direction of the ABS is from the side of the substrate 90b toward the side of the element-forming surface 90a.

It is desired in this case to maintain the angle $\theta_B$ at a constant value within the range from 60 degrees to 80 degrees in order to more uniform the direction of scratches produced by the lapping and thus to obtain good MR conversion characteristics. However, even if the lapping is executed by varying the angle $\theta_B$ within the range from 60 degrees to 80 degrees, the MR conversion characteristics can be improved up to a point.

In order to use the entire area of the lapping plate 91 for lapping, the bar 90 is preferably moved in one direction or in reciprocal directions along a radial direction of the lapping plate 91 at a slower speed such as 25 mm/min in comparison with the rotation speed of the lapping plate 91.

Because the ABS of the bar is thus lapped, it is possible to prevent not only a lowering of the resistance of the MR element but also degradation in MR conversion characteristics of the MR element.

Figure 10:
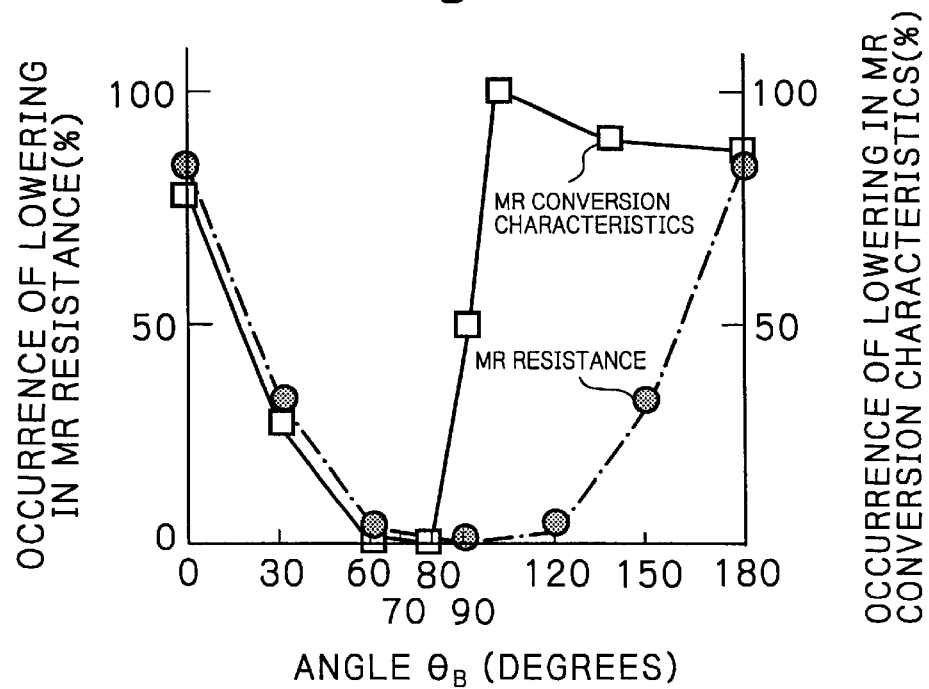
FIG. 10 shows a graph illustrating relationships between the angle $\theta_B$ which an element-forming surface of a bar forms with a radial direction of a lapping plate and occurrences of lowering in a resistance of an MR element and in MR conversion characteristics of the MR element.
Figure 11:
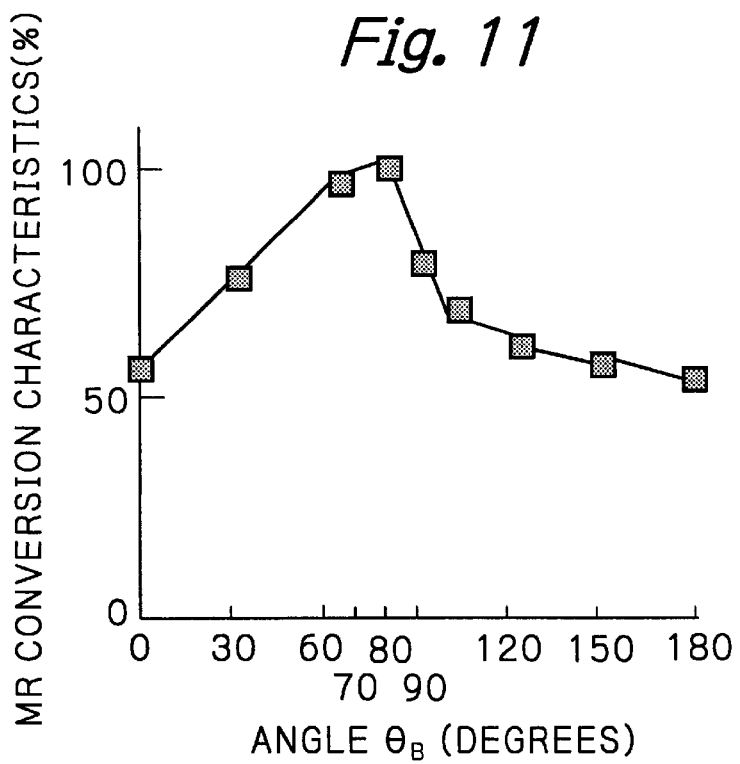
FIG. 11 shows a graph illustrating relationships between the angle $\theta_B$ which an element-forming surface of a bar forms with a radial direction of a lapping plate and MR conversion characteristics of the MR element.

FIG. 10 illustrates relationships between the angle $\theta_B$ which an element-forming surface of a bar forms with a radial direction of a lapping plate and occurrences of a lowering of a resistance of an MR element and in MR conversion characteristics of the MR element, and FIG. 11 illustrates relationships between the angle $\theta_B$ which the element-forming surface of the bar forms with the radial direction of the lapping plate and MR conversion characteristics of the MR element. As for lapping conditions, a rotation speed of the lapping plate 91 is 5 rpm, a particle diameter of the diamond abrasive is 0.25 µm, a lapping weight applied to the bar 90 is 50 grams/slider, and a length of the bar 90 is 70 mm.

As shown in FIG. 10, in case the angle $\theta_B$ is 0 degrees and 180 degrees, the occurrence of lowering the MR resistance becomes the maximum. This is because, in this case, because the direction in which the lapping plate is headed, namely, the lapping direction becomes perpendicular to the shield layers, lead conductor layers and the MR layer of the MR element, smears might be produced inducing short circuits between the shield layer and the lead conductor layer. When the angle $\theta_B$ approaches 90 degrees from 0 degrees or 180 degrees, the occurrence of lowering the MR resistance becomes small. Particularly, when the angle $\theta_B$ is in a range of 60 degrees to 120 degrees, the occurrence of lowering the MR resistance becomes extremely small.

In case the occurrence of lowering the MR resistance is large, current flowing through the MR layer decreases and thus the occurrences of lowering in MR conversion characteristics of the MR element becomes large. When the occurrence of lowering the MR resistance decreases, the occurrences of lowering in MR conversion characteristics of the MR element similarly decreases. However, this tendency holds only when the angle $\theta_B$ is in a range of 0 degrees to 80 degrees. When the angle $\theta_B$ exceeds 80 degrees, because the lapping direction reverses as shown in FIG. 7, the occurrences of lowering in MR conversion characteristics of the MR element becomes extremely large. Therefore, when the angle $\theta_B$ is in a range of 60 degrees to 80 degrees, the occurrence of lowering the MR conversion characteristics becomes extremely small.

As will be apparent from FIG. 11, when the angle $\theta_B$ which the element-forming surface of the bar 90 forms with the radial direction of the lapping plate 91 is in a range equal to or greater than 60 degrees and equal to or less than 80 degrees, the best MR conversion characteristics can be obtained and also the lowering in the MR resistance is small.

Many widely different embodiments of the present invention may be constructed without departing from the spirit and scope of the present invention. It should be understood that the present invention is not limited to the specific embodiments described in the specification, except as defined in the appended claims.

What is claimed is:

1. A lapping method of a magnetic head slider provided with an element-forming surface, an air bearing surface and a magnetoresistive effect element formed on said element-forming surface, said method comprising the steps of:

setting the magnetic head slider to be lapped on a lapping means; and lapping by said lapping means said air bearing surface of said magnetic head slider while keeping an angle between said element-forming surface of said magnetic head slider and a lapping direction in a range larger than 0 degree and equal to or smaller than 30 degrees, said lapping direction being from a side of a surface of said magnetic head slider, which surface is opposite said element-forming surface, toward a side of said element-forming surface.

2. A lapping method of a bar having a plurality of aligned magnetic head sliders, said bar provided with an element-forming surface, an air bearing surface and a plurality of magnetoresistive effect elements formed on said element-forming surface, said method comprising the steps of:

contacting the bar to be lapped to a rotating lapping plate while keeping an angle $\theta$ between said element-forming surface of said bar and a radial direction of said rotating lapping plate in a range equal to or greater than 60 degrees and equal to or less than 80 degrees; and lapping by said rotating lapping plate said air bearing surface of said bar by relatively moving said lapping plate in a direction crossing said air bearing surface from a side of a surface of said bar, which surface is opposite said element-forming surface, toward a side of said element-forming surface.

3. The method as claimed in claim 2, wherein said lapping step includes lapping said air bearing surface of said bar by fixing said angle $\theta$ at an angle in a range equal to or greater than 60 degrees and equal to or less than 80 degrees.

4. The method as claimed in claim 2, wherein said lapping step includes lapping said air bearing surface of said bar by varying said angle $\theta$ within a range equal to or greater than 60 degrees and equal to or less than 80 degrees.

5. The method as claimed in claim 2, wherein said lapping step includes lapping said air bearing surface of said bar by using said lapping plate having a diamond abrasive.

* * * * *

UNITED STATES PATENT AND TRADEMARK OFFICE
CERTIFICATE OF CORRECTION

PATENT NO. : 6,679,760 B2  Page 1 of 1
DATED : January 20, 2004
INVENTOR(S) : Osamu Fukuroi et al.

It is certified that error appears in the above-identified patent and that said Letters Patent is hereby corrected as shown below:

<u>Title page,</u>
Item [73], Assignee, change "Sae Magentics (H.K.) Ltd., Kwai Chung (HK)" to
-- SAE Magentics (H.K.) Ltd., Kwai Chung (HK) --

Signed and Sealed this

Fourth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,679,760 B2
DATED : January 20, 2004
INVENTOR(S) : Osamu Fukuroi et al.

It is certified that error appears in the above-identified patent and that said Letters Patent is hereby corrected as shown below:

<u>Title page,</u>
Item [73], Assignee, change "Sae Magentics (H.K.) Ltd., Kwai Chung (HK)" to
-- SAE Magnetics (H.K.) Ltd., Kwai Chung (HK) --

Signed and Sealed this

Fifteenth Day of February, 2005

JON W. DUDAS
*Director of the United States Patent and Trademark Office*